June 8, 1943.　　　　H. C. LANGHORST　　　　2,321,030
UNIVERSAL SHAPER
Filed Oct. 14, 1941　　　　8 Sheets-Sheet 5

INVENTOR
HOWARD C. LANGHORST
BY
ATTORNEYS

Patented June 8, 1943

2,321,030

UNITED STATES PATENT OFFICE 2,321,030

UNIVERSAL SHAPER

Howard C. Langhorst, Dayton, Ohio

Application October 14, 1941, Serial No. 414,931

20 Claims. (Cl. 90—13)

(Granted under the act of March 3, 1883, as amended April 30, 1928; 370 O. G. 757)

The invention described herein may be manufactured and used by or for Government for governmental purposes, without the payment to me of any royalty thereon.

This invention relates to shapers and is particularly useful in producing irregular shapes, cross sections of which, from one end to the other, may vary in size, contour and relative position. It may also be employed in shaping members which are of a uniform cross section throughout their length, but wherein the cross section is irregular or unsymmetrical.

In the operation of most of the machines which have heretofore been made for producing work of this kind, an exact model of the article to be produced is first made, and this model is so mounted in the machine that it serves to guide cutting tools in the course which they must travel to cut the article from a suitable blank of the desired material.

The difficulty with this procedure, however, is that the exact model referred to must be made to extremely accurate contour and to extremely accurate dimensions if it is to produce an accurate product, and since the model must be made before the product can be made, the model is of necessity made by hand.

Now there is no great difficulty in accurately producing an irregular contour in a single plane, as in a plate cam, or in generating the surface of an irregular cylinder, since many cam cutting or grinding machines are in common use producing shapes of this kind, but to produce by hand, a model of a member in which no two right cross sections are the same, either in size or contour, or position with respect to a longitudinal axis, is an extremely costly procedure.

When such accurate models must be produced, the work is usually accomplished by predetermining the proper size and shape and the position with respect to an arbitrary longitudinal axis to which each of a selected number of spaced-apart cross sections should conform, and machining a narrow strip around the periphery of the member conforming at each of the selected sections to the shape predetermined for that section, after which the intermediate portions are finished by hand to conform to eyesight grading of one shape into the next.

It is therefore an object of this invention to provide a machine for which no such accurate model is needed, but wherein a series of simple plate cams may be laid out and produced from the drawing of the product which is to be made, such plate cams, when properly mounted in the machine, constituting the entire guiding means required to guide the cutting tools in their course in cutting an irregular shape in which cross sections vary in size, contour and position throughout the length of the article.

Another object is to provide a machine which requires very little time and labor to readjust it when changing from the production of one article to another.

Another object is to provide a machine in which the cutters are of very simple construction and wherein a single cutter head only is required for all shapes within the capacity of the machine.

Other objects and advantages will be recognized as the following description is read and reference is made to the accompanying drawings, wherein.

Like numerals refer to like parts throughout the several views.

In the drawings, which show an illustrative embodiment of the invention set up for shaping an irregular piece such as may be used in an aircraft propeller blade or test wing, a base 20, at its longitudinal extremities, carries a left end frame 22 and a right end frame 24. Frame extensions 26 and 28 are provided for the end frames 22 and 24 respectively, the extensions, at their upper end, having bearings 30 and 32 for rotatably supporting a feed screw 34 and further down having bearings 36 and 38 for supporting a rocker shaft 40.

Figure 3:
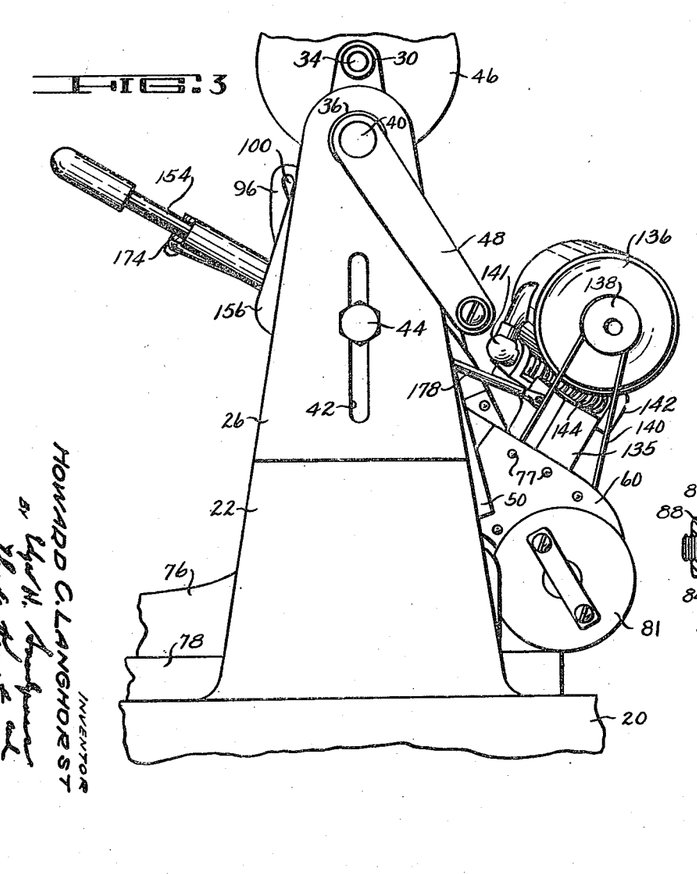
Figure 3 is a left-hand end view.

The lower ends of the extensions 26 and 28 are slotted as at 42 (see Fig. 3). Bolts 44 extend through the end frames and the slots to fix the extensions at any desired height, whereby the feed screw 34 and rocker shaft 40 may be raised and lowered as the article to be shaped varies in vertical dimensions. A pulley 46 is provided for power rotation of the feed screw 34 and an operating arm 48 is provided for manually rocking the rocker shaft, although, of course this shaft may be rocked by any suitable reciprocating power means.

Spaced apart on the shaft 40 are the left rocker arm 50 and the right rocker arm 52, the hubs of which are provided with set screws 54 whereby the arms may be adjusted to different axially spaced positions for shaping parts of different lengths, or to different angularly spaced positions for a product in which opposite ends are shifted with respect to a longitudinal axis.

Figure 4:
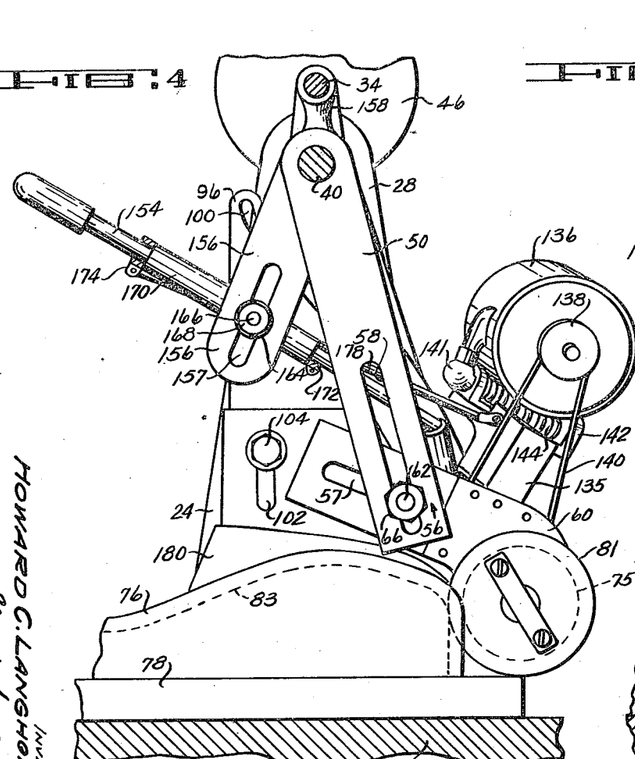
Figure 4 is a transverse section, taken at 4—4 of Figure 1, showing the left cam with its follower and rocker arm.
Figure 9:
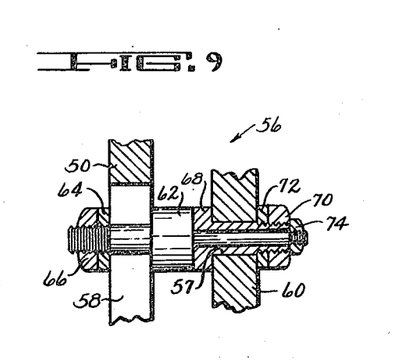
Figure 9 is an enlarged fragmentary section, taken at 9—9 of Figure 1 showing the left hinge shaft.

Hinged to the lower end of the rocker arm 50 by a hinge means 56 is the left cam follower arm 60. The hinge means 56 is shown in Figure 9 and comprises a stud 62 held nonrotatably secured to the arm 50 by the washer 64 and nut 66, the whole lower portion of the arm 50 being slotted as at 58 (see Fig. 4) to allow vertical adjustment of the stud along the arm when the nut 66 is loosened. One end of the left cam follower arm 60 also is slotted as at 57 to receive the sleeve 68 which is freely rotatable on the stud 62. A nut 70 and washer 72 are provided to clamp the sleeve in a selected position on the slotted end of the arm. A second nut 74 tightens against a shoulder on the stud 62 and therefore holds the sleeve 68 on the stud without hampering its rotation.

Figure 1:
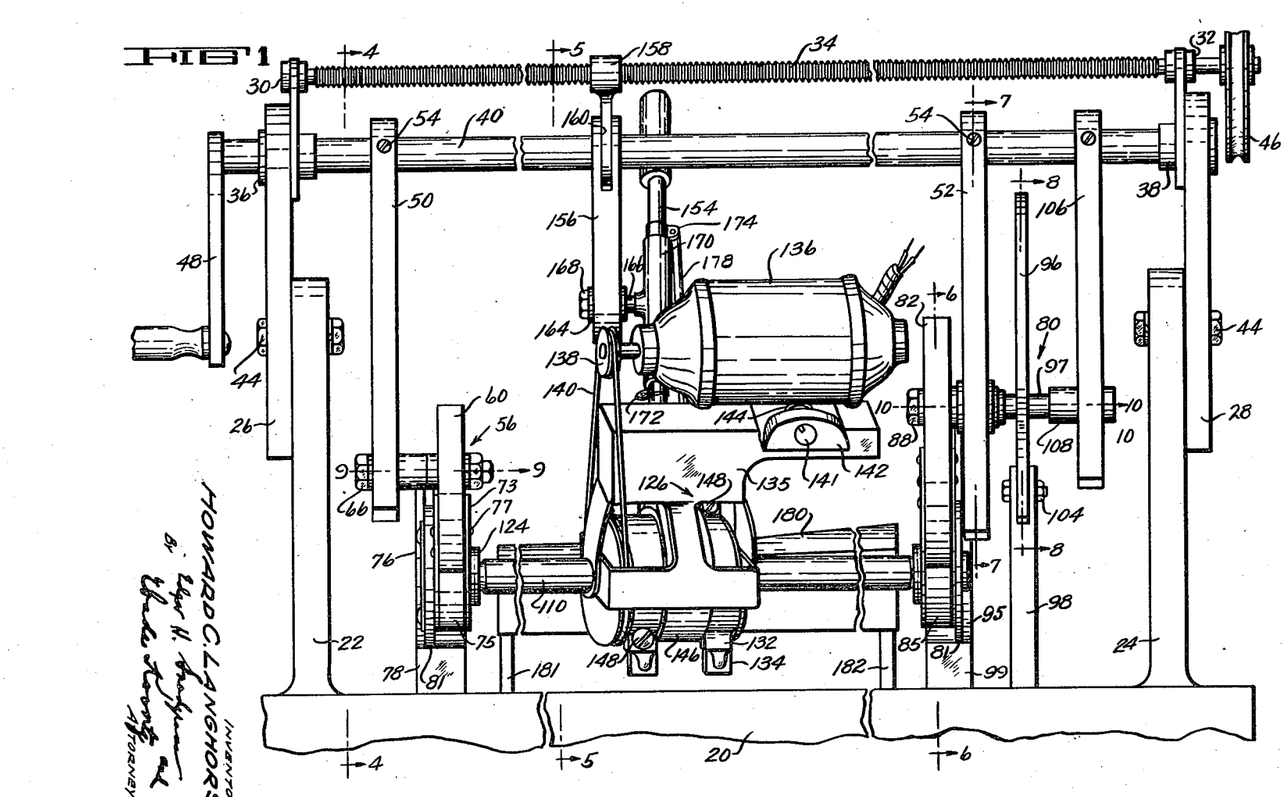
Figure 1 is a front elevation of the improved shaper.
Figure 2:
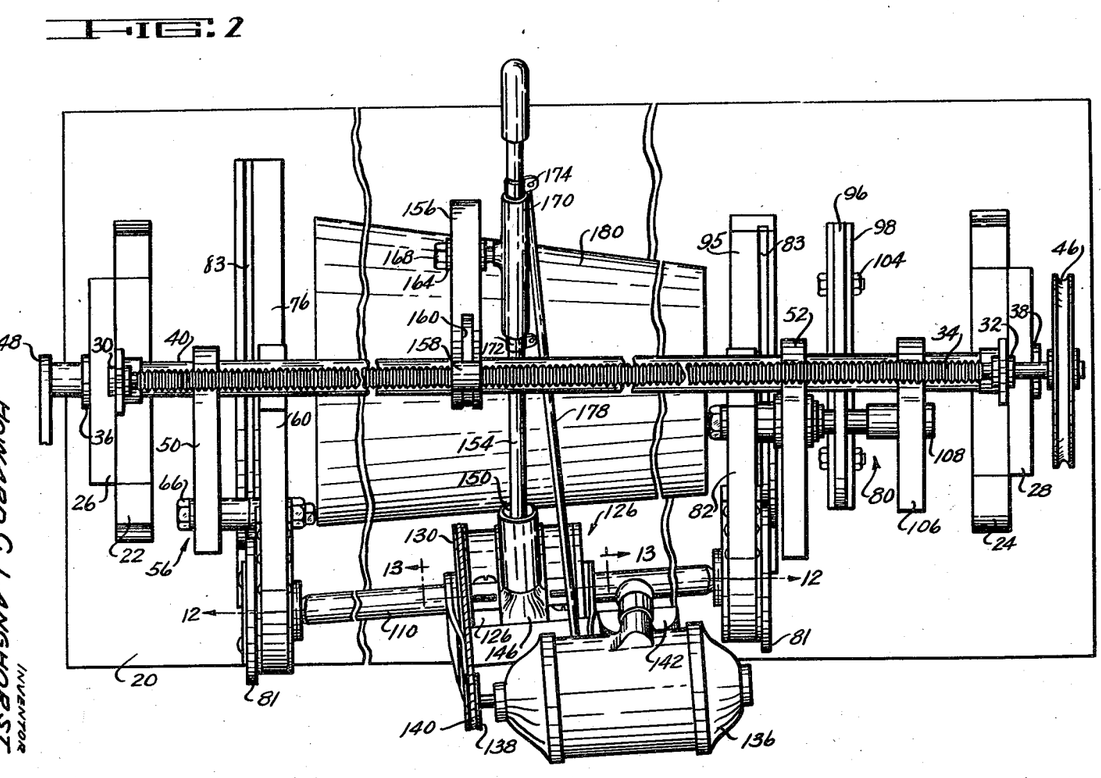
Figure 2 is a top plan view of the shaper.
Figures 8, 12, 12A:
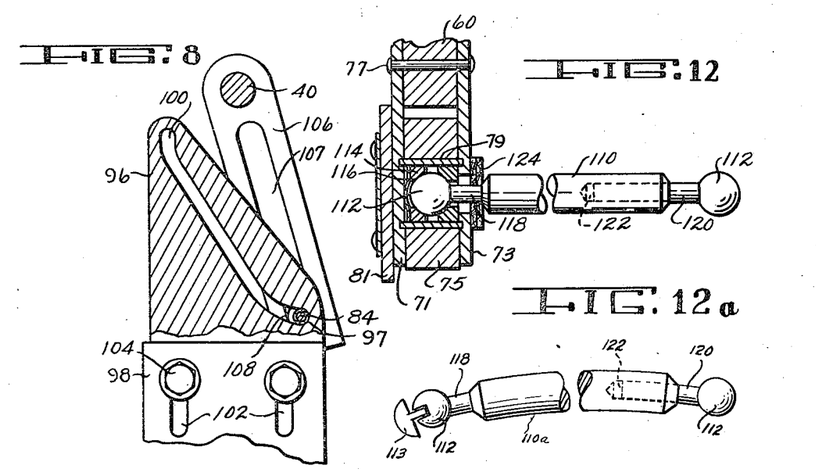
Figure 8 is a transverse section, taken at 8—8 of Figure 1, through the control cam and its holder.
Figure 12 is fragmentary section taken at 12—12 of Figure 2 through one cam roller and with the cutter head removed, showing the cutter shaft and its supporting means.
Figure 12a shows how the cutter shaft may be bent to modify the part shaped.

With this arrangement, the hinge means 56 may be given arcuate movement about the axis of the shaft 40, while the free end of the cam follower arm 60 which is preferably provided with a cam roller 75 (see Figs. 1 and 12), although this roller may be omitted by making the lower end of the follower arm itself of suitable shape, will rise and fall as the roller follows the irregular contour of the plate cam 76 upon which the roller is resting. The roller 75 is held between two plates 71 and 73 (see Fig. 12) by rivets 77. A sleeve 79 is supported in annular grooves in the plates 71 and 73 thereby providing rotative bearing for the roller. The cam 76 is mounted on a cam support 78 extending upward from the base 20, whereby the cam is maintained in the same right plane as the follower arm. A plate 81, secured to the side of the plate 71 rides in a groove 83 in the cam 76, whereby movement of the roller 75 over the cam is additionally guided.

Figure 10:
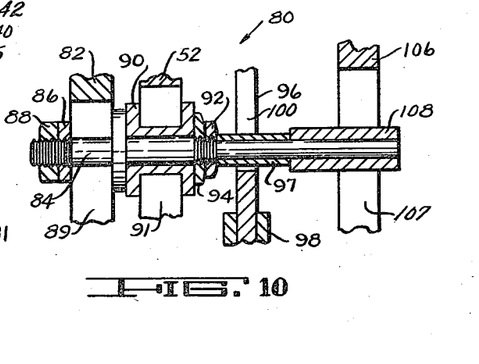
Figure 10 is an enlarged fragmentary section taken at 10—10 of Figure 1, showing the right hinge shaft.

Hinged to the depending end of the rocker arm 52 by a hinge means 80 is the right cam follower arm 82. The hinge means 80 is shown in Figure 10 and comprises a cam shaft 84 held nonrotatably secured to the right cam follower arm 82 by the washer 86 and nut 88, the upper end of the cam follower arm 82 being slotted as at 89 to allow movement of the cam shaft along the arm when the nut 88 is loosened. The depending portion of the right rocker arm 52 also is slotted as at 91 to slidably receive the cam shaft sliding bearing 90 within which the cam shaft 84 rocks freely. A nut 92 holds a washer 94 against a shoulder on the shaft, whereby axial movement of the bearing on the shaft is prevented without interfering with its rotation.

Figure 6:
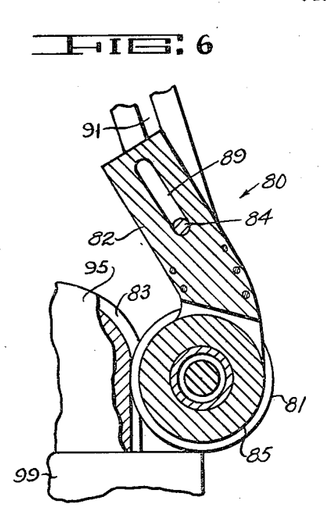
Figure 6 is a transverse section, taken at 6—6 of Figure 1, through the right cam and its follower.
Figure 7:
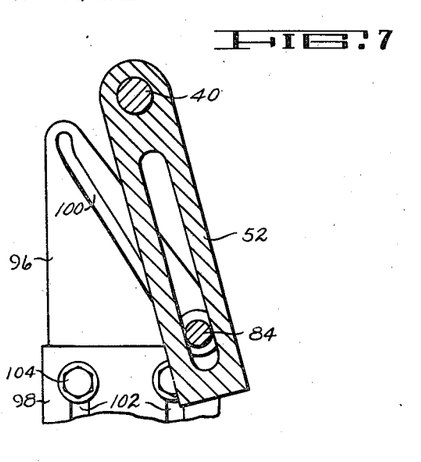
Figure 7 is a transverse section, taken at 7—7 of Figure 1, through the right rocker arm and the cam shaft sliding bearing.

Rocking of the arm 52 by means of the rocker shaft 40 swings the hinge means 80, which in turn swings the cam follower arm 82, the free end of which may rise and fall in order that the roller 85 which is rotatably supported on the free end may follow any irregular contour of the plate cam 95 upon which the roller rests. The roller 85 is rotatably supported on the cam follower arm 82 in the same manner as described with reference to the roller 75 and shown in Figure 12. A like plate 81 rides in a groove 83 (see Fig. 6) to steady the movement of the roller across the cam. A cam supporting means 99 extends upwardly from the base to support the cam. It should be noted, however, that while, at the left end of the machine, the hinge means 56 is adjusted and clamped at a selected distance from the axis of the shaft 40, where it remains as long as a given contour is being shaped, the hinge means 80 at the right of the machine has no fixed position on the arm 52 but may slide up and down on the arm during the course of its oscillatory movement.

The mechanism which causes the hinge means 80 to move up and down on the arm 52 in the course of its oscillatory movement, comprises a plate cam 96 held on a vertical support 98. The cam is provided with an irregular slot 100 through which the cam shaft 84 extends. A roller 97 surrounds the shaft and its outside diameter fits freely in the cam slot. The cam 96 may conveniently be called the control cam since it governs the amount and ratio of the transverse movement of the cam roller 85 with respect to that of the cam roller 75.

The cam support 98 is provided with slots 102 through which bolts 104 extend for adjusting the vertical position of the cam 96 with respect to the base 20. This adjustment is required because, as the front-to-rear width of the piece which is being shaped is narrower at the right end, with respect to the left end, the front-to-rear travel of the roller 85 will be proportionately less with respect to the travel of the roller 75 and the center-to-center distance between the rocker shaft 40 and the cam shaft 84 will be proportionately less than the center-to-center distance between the rocker shaft 40 and the hinge stud 62. The cam 96 must therefore occupy a higher position as the right hand end of the piece which is being shaped is narrower front-to-back with respect to the left hand end.

An auxiliary rocker arm 106 is provided for steadying the outer end of the cam shaft 84, (see Fig. 10) the depending end of this arm being slotted as at 107 to receive the roller 108 which is freely rotatable on the end of the shaft. The roller serves as an outboard bearing as well as a balance weight.

A cutter bar 110 is provided at each end with a ball 112 (see Fig. 12) which is held between collars 114, which are axially slidable in the sleeves 79. A spring washer 116 keeps the collars 114 pressed together on the ball whereby a socket for the ball is formed which maintains perpetual adjustment for wear and at the same time restrains rotation of the bar. The shank 118 at one end of the bar is integral therewith while the shank 120 at the other end is separate from the bar and fits slidably into an opening 122. Thus mounted, the bar 110 may, when so required, assume different lengths from center to center of balls 112. Felt washers 124 keep dirt out of the ball sockets. The cutter bar 110 thus shown and described is straight, but it will be understood that it may be slightly bowed as shown at 110a in Figure 12a, or otherwise deflected from a straight line to modify the work piece at cross sections intermediate the ends if such modification becomes desirable. Of course, in such a case, the cutter bar must needs be positively denied rotation by suitable means, such as the end key 113.

A cutter head 126 is freely rotatable on the bar 110 and is slidable from one end to the other thereon. This head comprises a sleeve 128 having a pulley 130 at one end and axially spaced apart supporting means 132 with screws 148 for holding a series of cutters 134. A motor stand 135 is supported on the bar at each end of the cutter head and carries the motor 136 which rotates the cutter head. The motor shaft, at one end, carries the pulley 138. A belt 140 encircles the two pulleys, whereby the cutter may be driven by means of the motor.

Hinge ears 142 at one end of the motor stand cooperate with a hinge pin 141 extending from the motor frame, whereby the motor may rock through an axial plane to keep the belt 140 taut. A spring 144 between the ears 142 is tensioned and connected to urge the motor to rock in the proper direction and with sufficient force to give the belt the required tension.

The feed mechanism for traversing the cutter head 126, from one end to the other of the bar 110, includes a split collar 146, the halves of which are held together by screws 151. Collar 146 surrounds the head 126, being retained freely between shoulders on the head, whereby the head may rotate freely on the bar and in the collar, but the collar may not move axially with respect to the head. The split collar 146 on its upper side carries a universal joint socket 150 into which a ball 152 carried on the end of a rod 154 is nested.

Intermediate the rocker arm 50 and 52, on the shaft 40 is a feed arm 156. Arm 156 is not in any manner fastened to the shaft 40, whereby it may be rocked through a greater or a less arc as it is nearer the left or the right end of its travel. A feed nut 158 is internally threaded to fit the feed screw 34, its lower end being in the shape of a fork which extends into an annular groove 160 in the hub of the feed arm 156.

Figure 5:
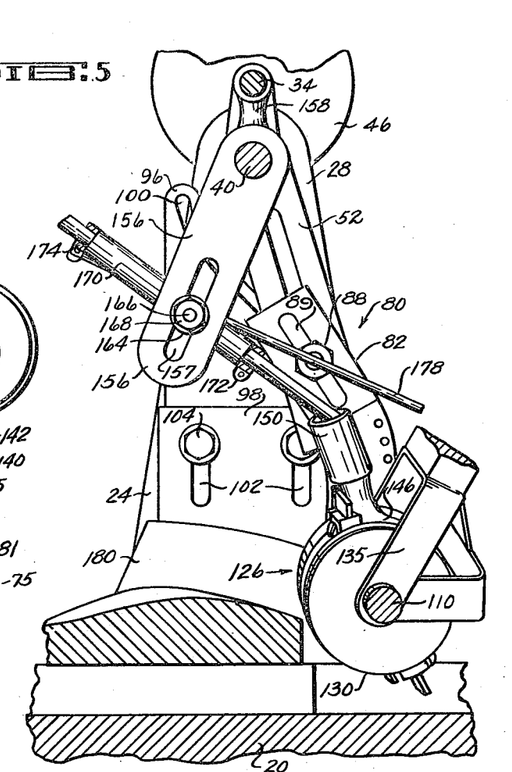
Figure 5 is a transverse section, taken at 5—5 of Figure 1, showing the cutter with its driving motor, motor support and feed mechanism.
Figure 14:
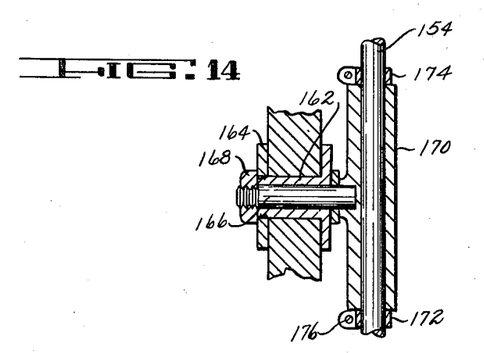
Figure 14 is an enlarged fragmentary section taken through the hinge joint of the cutter feed rocker arm.

The lower end of the feed arm 156 is slotted as at 157 (see Fig. 5) to receive a bushing 162 (see Figure 14) which may be clamped by a nut 168 and washer 164 in a selected position along the arm. A hinge stud 166 is freely rockable in the bushing 162, the stud being held against withdrawal from the bushing by the nut 168, the opposite end having a long hub 170 with a transverse hole for receiving the rod 154.

The rod 154 is slidable in the hub 170 for adjustment only, and when so adjusted is held against axial movement with respect to the hub by clamp collars 172 and 174 held to the shaft in the positions selected by screws 176. A stay rod 178 extends from the collar 174 to the motor stand 135 to restrain rocking movement of the stand around the shaft.

Figure 11:
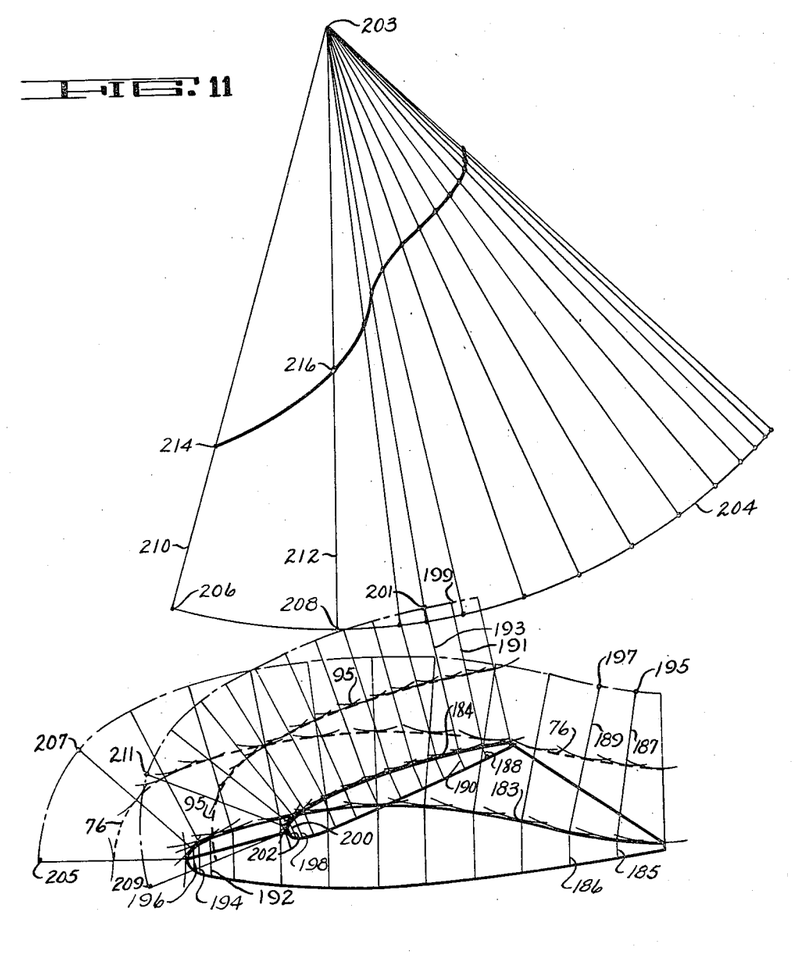
Figure 11 is a diagrammatic illustration of the procedure followed in laying out the control cam.
Figure 13:
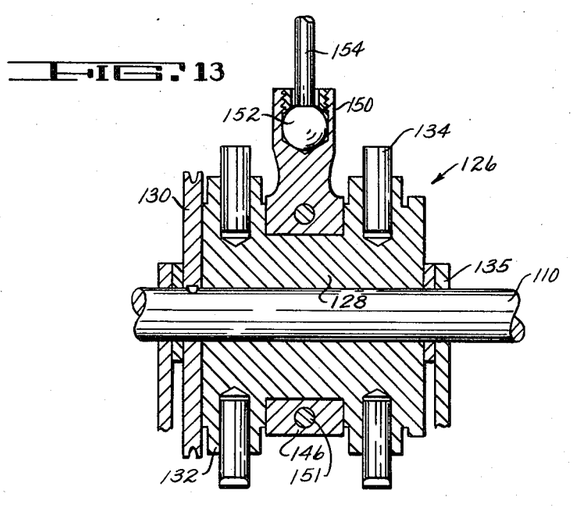
Figure 13 is a fragmentary axial section taken at 13—13 of Figure 2 through the cutter head.

When the improved shaper herein disclosed is to be set up for producing a given work piece, such, for instance, as is shown at 180 in the drawings, supported on the work holders 182 and 184, the cams 76, 95, and 96 must be laid out, the procedure for laying them out being shown in the diagrammatic view Figure 11.

Assume that, looking from the right hand end of the machine, the large end of the work piece i. e., that farthest from the observer, has an outline as at 183 and the small end, i. e., the end closest to the observer, has an outline as at 184.

The front-to-rear path which the center of the cutter 126 must take when cutting the end outlines 183 and 184 may be found by laying out the cutter radius to the same scale as the end outlines and drawing short arcs tangent to the outlines in a number of positions as shown. The radii of the cam rollers 75 and 85 may then be laid out with their centers coincident with the centers of the cutters. The path thus indicated by the outside of the cam rollers will be the required shape of the cams 76 and 95.

Assuming in the instant case, although this is not always true, that in the particular work piece shown, any cross section intermediate the ends 183 and 184 is to have an outline which, in both size and contour, is a mean which is exactly proportional to its position between the two ends.

The means for moving the rollers over their respective cams should in such case be so made that their movements are proportional, i. e., when the roller 75 has moved one-tenth of its total required travel over the cam 76, the roller 85 will also have moved one-tenth of its total required travel over the cam 95, and when the roller 75 has moved through half of its total travel over its cam 76, the roller 85 will likewise have moved over half of its total travel over the cam 95, etc. Only when this is true will any cross section intermediate the ends 183 and 184 be a mean between the ends which is proportional to its position therebetween.

Since the means for moving the roller 75 through its course on the cam 76 comprises the rocker shaft 40, rocker arm 50, and follower arm 60, the center of the rocker shaft is laid out to scale and will be at 203 and a position for the hinge means 56 is selected along the arms 50 and 60 which provides the easiest average action of the roller 75 over its cam 76 throughout its stroke. The rocker arm 50 may then be secured to the rocker shaft 40 by means of the set screw 54.

In order to insure that the travel of the rollers 75 and 85 will be proportionate in all positions, the following procedure is employed:

The outline of the large end 183 is divided by lines 185, 186, etc., into ten equal parts and the outline of the small end 184 is likewise divided by lines 188, 190, etc., into ten equal parts. For greater accuracy, the first division at the left of outline 183 may be subdivided into halves, quarters and eighths by lines 192, 194 and 196 and the first division at the left of outline 184 similarly subdivided by lines 198, 200, and 202.

From the points where the lines 185, 186, 192, etc., intersect the outline 183 and from the points where the lines 188, 190, 198, etc., intersect the outline 184, radial lines 187, 189, etc. and 191, 193, etc., are laid off normal to the curves of the outlines. Cutter head radii are then laid off on each radial line from the outlines 183 and 184, the centers being at 195, 197, etc., for the large outline 183, and at 199, 201, etc., for the small outline 184. Short arcs of the cam roller radii are then drawn from the same centers 195, 197, 199, 201, etc., as the arcs of the cutter head. These cam roller arcs will then define the outline of the cams 76 and 95.

The arc 204, representing the path of the hinge means 56 is then drawn, and, with a radius equal to the selected length of the follower arm 60, the points 206, 208, etc., representing the positions of the hinge means 56 for each position 205, 207, etc., of the center of the roller 75, are laid out on the arc 204. Radii 210, 212, etc., are then drawn from the axis 203 of the rocker shaft 40 to the several points laid off on the arc.

Since the rollers 75 and 85 must reach numerically equal points in their front-to-rear travel simultaneously, and the rocker arms 50 and 52, which impart movement to the rollers, necessarily have equal angular movement about the rocker shaft 40, it follows that if the follower arm 82 is maintained at constant length throughout the travel of the roller 85 over cam 95, the position of the hinge member 80 along the rocker arm 52 will constantly change.

The center distance on the follower arm 82 between the cam roller 85 and the hinge member 80 is not critical but will ordinarily be considerably greater than the hinge-to-roller distance on the arm 60, in order that the effective portion of the arm 52 may be shorter, and the travel of the roller 85 therefore much less than the travel of the roller 75, this matter being governed, of course, by the difference between the width of the two ends of the work piece.

Having thus arbitrarily selected the roller-to-hinge dimension for the follower arm 82, which dimension on the diagram Fig. 11 is from point 209 to point 214, this dimension is laid off on the diagram from the several centers 209, 211, etc., of the roller 85 to corresponding radial lines 210, 212, etc., the points of intersection 214, 216, etc., with these radial lines representing the path which the hinge means 80 must take in order that the rollers 75 and 85 may each reach the same proportionate part of its total travel at the same time. The slot in the control cam 96 is therefore so cut that the center of the roller 97 will follow a line connecting the several intersections 214, 216, etc., and in doing so will cause the cutter head 126 to cut the contour 183 when it is at the left end of its traverse, cut the contour 184 when it is at the right end of its traverse, and, at any intermediate point in the work piece, cut a contour which is a mean proportional to its position with respect to the two ends.

It will of course be understood that the shape of the slot of the control cam 96 will be governed wholly by the difference in size, contour and position of the right-hand end of the work piece with respect to the left-hand end so that while, in the embodiment described and shown in Figures 1 to 14 inclusive, the rocker arms 50 and 52 are in the same plane they may well be employed to better advantage in shaping a work piece of different shape if these arms are set in different planes, and while, because of the angular displacement anticlockwise of the end 184 with respect to the end 183 requires a cam slot which extends uphill from front to back of the machine, it may well be that, when the angular displacement of the small, with respect to the large end of the work piece is clockwise, the cam slot may extend downhill from front to back of the machine.

Figure 15:
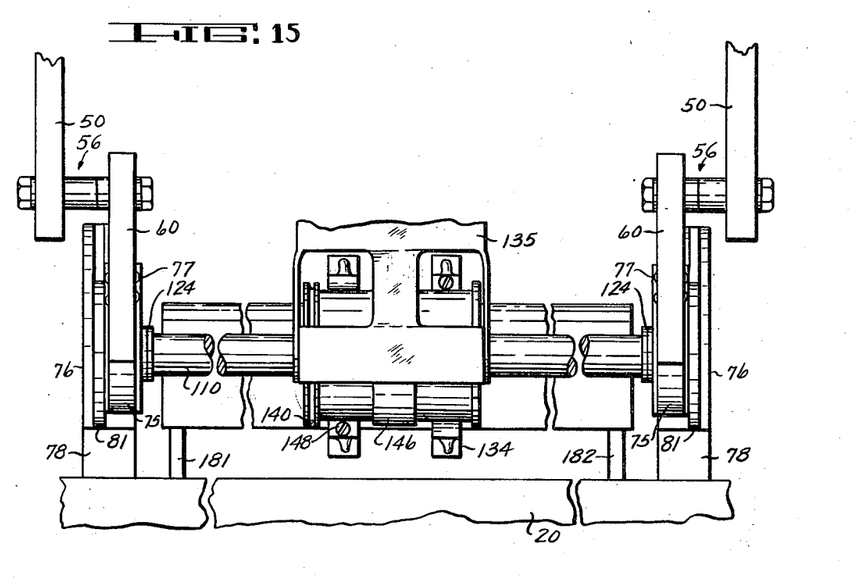
Figure 15 is a front view of a modification of the device shown in Figures 1 to 14 inclusive.

The modification shown in Figure 15 is intended to be used only when the work piece, although of irregular cross section, is nevertheless uniform throughout its length. In this modification both left and right hand ends of the mechanism are alike, the hinge means 56 at both ends being adjusted the same with respect to the rocker arms and follower arms.

The ball and socket joints at the ends of the cutter bar 110 may be replaced with plain journals and bearings since the cutter bar always remains parallel to the rocker shaft. In other respects the modification may be substantially like that first described.

Having described the invention, I claim:

1. For shaping an irregular surface on a work piece, a machine which comprises, in combination, a frame, means on the frame for holding the work piece, cams supported on said frame at each end of the work piece, cam follower members at the ends of the work piece resting on said cams, a cutter bar having its ends carried one on each follower member, a cutter head rotatable and axially slidable on said bar, means to rotate said cutter head, means to move said cutter head axially over said bar, and means to move said bar transversely of its length with said cam follower members resting on said cams.

2. The structure of claim 1 wherein the means to move said bar transversely is separately adjustable for each end whereby one end may have greater transverse movement than the other.

3. The structure of claim 1 wherein the cams at opposite ends of the work piece are of different contour whereby the bar may follow a different transverse course at one end than at the other.

4. The structure of claim 1 wherein the means to rotate said cutter head comprises a motor support frame carried on said bar adjacent said cutter head and axially slidable on said bar, an electric motor on said frame and means drivably connecting said motor and cutter head.

5. For shaping an irregular surface on a work piece, a machine which comprises, in combination, a frame, means for locating said work piece with respect to said frame, a rocker shaft rockable in said frame, rocker arms axially spaced on said shaft to be rocked thereby, cams supported on said frame adjacent the ends of the work piece, cam follower arms hinged to said rocker arms, the swingable ends of said cam follower arms resting on said cams, a cutter bar having its ends carried on the swingable ends of said follower arms, a cutter head rotatable and axially movable on said cutter bar, means to rock said rocker shaft, means to rotate said cutter head, and means to move said cutter head along said cutter bar.

6. The structure of claim 5 with adjusting means to make the effective length of one of said rocker arms longer than the other whereby rocking said rocker shaft swings the cam follower arm at one end through a greater distance than it swings the cam follower arm at the other end.

7. The structure of claim 5 with the cam at one end of the workpiece of different contour than the cam at the other end, whereby one end of the cutter bar moves through a different path than the other.

8. The structure of claim 5 wherein the means to move said cutter head along said bar comprises a feed screw with axis parallel to that of the rocker shaft, rotatably supported in said frame, a feed arm intermediate the rocker arms freely rockable on said rocker shaft, a feed nut on said feed screw with a part extending into a groove in said feed arm, and a rod having one end hinged to said feed arm and the other end to said cutter head.

9. For shaping an irregular surface on a work piece, a machine which comprises, in combination, a frame, means on said frame to support said work piece, a rocker shaft rockable in said frame, rocker arms axially spaced on said shaft to be rocked thereby, cams supported by said frame adjacent the ends of the work piece, cam follower arms hinged to said rocker arms, cam rollers rotatably held on the free ends of said cam follower arms and resting on said cams, a cutter bar having its ends carried on the free ends of the follower arms, a cutter head rotatable and axially movable on said cutter bar, means to rock said rocker shaft, means to rotate said cutter head and means to move said cutter head axially on said cutter bar.

10. The structure defined in claim 9 wherein the cam at one end of the work piece differs in contour from the cam at the other end of the work piece, whereby one end of the cutter bar moves through a different path than the other end, and the cutter head moves through a path which is a mean proportional to its position between the two ends of the bar.

11. For shaping an irregular surface on a work piece, a machine which comprises, in combination, a frame, means on said frame to support said work piece, a rocker shaft rockable in said frame, rocker arms axially spaced on said shaft to be rocked thereby, cams supported by said frame adjacent the ends of the work piece, cam follower arms adjacent said rocker arms, hinge means for pivotally joining the rocker arms to the follower arms, said hinge means being movable to alter the effective length of the rocker arms and the follower arms, cam rollers rotatably held on the rockable ends of the follower arms, the outside of said rollers resting on said cams, a cutter bar having its ends anchored in the center of said rollers, a cutter head rotatable and axially movable on said cutter bar, means to rock said rocker shaft, means to rotate said cutter head and means to move said cutter head axially on said cutter bar.

12. The article defined in claim 9 with a ball on each end of the cutter bar and sockets for said balls centrally disposed in said cam rollers.

13. For shaping an irregular surface on a work piece, a machine which comprises, in combination, a frame, means on said frame to support said work piece, a rocker shaft rockable in said frame, rocker arms axially spaced on said shaft to be rocked thereby, cams supported by said frame adjacent the ends of the work piece, cam follower arms adjacent said rocker arms and resting on said cams, hinge means for hinging together the rocker arms and the cam follower arms manually adjustable along said follower arms for altering the effective length of the follower arms, said hinge means being separately adjustable whereby the effective length of the one follower arm may be greater than that of the other, a cutter bar having its ends anchored in the free ends of said follower arms, a cutter head rotatable and axially movable on said bar, means to rock said rocker shaft, means to rotate said cutter head and means to move said cutter head axially on said bar.

14. The machine described in claim 11 wherein the hinge means is also separately adjustable along the rocker arms, whereby the effective length of the rocker arm at one end of the machine may be greater than the effective length at the other.

15. The structure of claim 11 wherein the hinge means is also separately adjustable along the rocker arms, the position of the hinge means along the rocker arm at one end being selectively adjustable manually while the machine is inoperative and the position of the hinge means along the rocker arm at the other end is slidable to different positions, and means to slide said hinge means to different positions along the rocker arm while the machine is operating.

16. In a device of the character described, a frame, means on said frame to support a work piece, a rocker shaft rockable in said frame, rocker arms secured to said shaft in axially spaced positions to be rocked thereby, cams adjacent the ends of the work piece on said frame, cam follower arms associated with said rocker arms each having a swingable end resting on said cams, means hingedly connecting the rocker arms and the follower arms, the hinge means at one end being fixed with respect to the follower arm but slidable lengthwise with respect to the rocker arm, a control cam operatively associated with said hinge means adapted to slide said hinge means along said rocker arm as the said rocker arm rocks, a cutter bar having its ends supported on the swingable end of said follower arms, a cutter head rotatable and axially slidable on said bar, means to rock said rocker shaft, means to rotate said cutter head, and means to move said cutter head axially on said cutter bar.

17. The structure of claim 16 with an adjustable cam supporting means on said frame for positioning said control cam.

18. A shaper of the character described comprising, in combination, a frame, supports holding a work piece on said frame, cams of the contour of the ends of the work piece secured to the frame adjacent said ends, cam follower arms adjacent said ends, cam follower rollers on the arms at one end for riding over the surface of the cams, hollow journals carried by said follower arms for rotatably supporting said rollers, rocker arms for rocking the follower arms to draw the rollers across the cam surfaces, hinge means at the one end manually adjustable to alter the effective length of both the follower arm and rocker arm, hinge means at the other end manually adjustable to alter the effective length of the follower arm but slidable automatically along the rocker arm to alter its effective length as it rocks, a control cam adjustably supported on said base for sliding said hinge means along said rocker arm, a rocker shaft supported in said frame and secured in said rocker arms for rocking said arms, a cutter bar having ball ends centrally supported in said journals, a cutter head rotatable and axially movable over said bar, a motor support carried on said bar, a motor on said support for rotating said cutter head, a feed arm freely rockable and axially movable on said rocker shaft, a feed rod hinged to said feed arm and to said cutter head, a feed screw adjacent said feed arm, and a feed nut on said feed screw for feeding said feed arm axially over said rocker shaft.

19. The structure defined in claim 18 with spring actuated take up collars within the said hollow journals for holding the cutter bar ball ends between them, whereby a constant adjustment for wear of the ball ends is provided.

20. The structure of claim 18 in which the cutter bar is curved longitudinally to modify the shape of the work piece.

HOWARD C. LANGHORST.